C. A. HUNT.
VEHICLE SPRING.
APPLICATION FILED JULY 12, 1920.
1,389,135.
Patented Aug. 30, 1921.
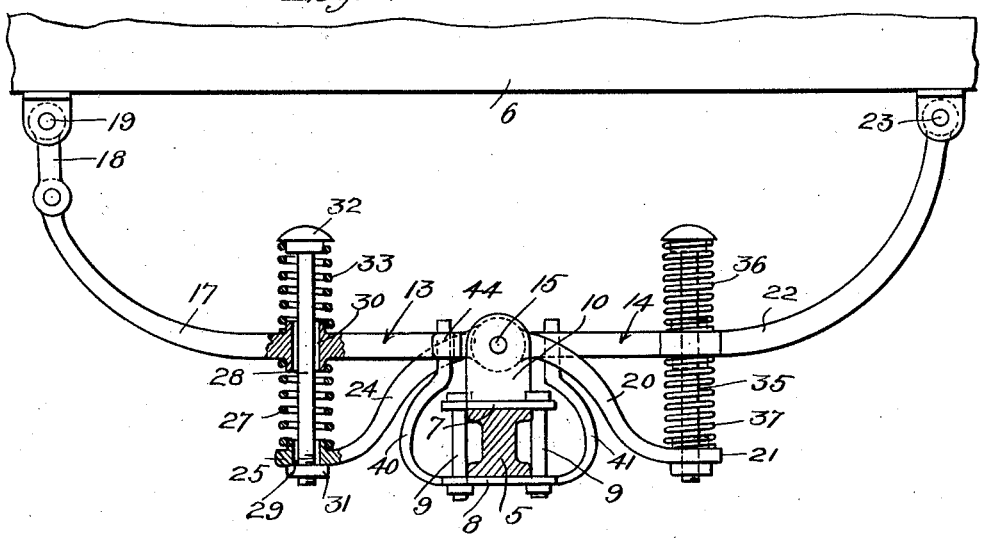
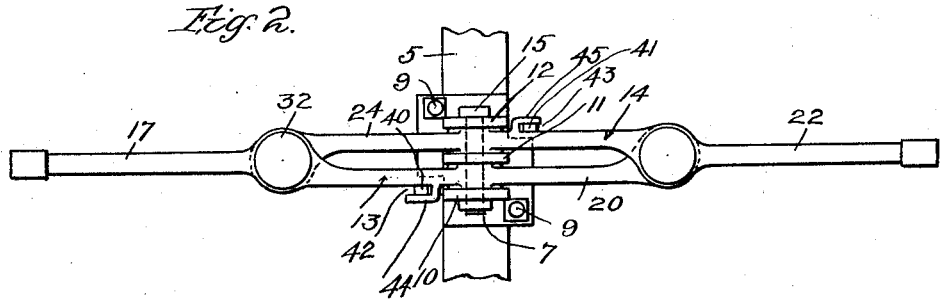
INVENTOR
Charles A. Hunt
BY
ATTORNEY Une# UNITED STATES PATENT OFFICE.

CHARLES A. HUNT, OF CHINO, CALIFORNIA.

VEHICLE-SPRING.

1,389,135.   Specification of Letters Patent.   Patented Aug. 30, 1921.

Application filed July 12, 1920. Serial No. 395,558.

*To all whom it may concern:*

Be it known that I, CHARLES A. HUNT, a citizen of the United States, residing at Chino, in the county of San Bernardino and State of California, have invented new and useful Improvements in Vehicle-Springs, of which the following is a specification.

My invention relates to vehicle springs and is particularly adapted to be used in connection with automobiles or other vehicles to resiliently support the body thereof on the running gear, to absorb the downward thrust of the vehicle body, as well as to resiliently compensate for the rebound of the vehicle body, when the vehicle passes over obstructions or depressions in the road.

The object of my invention is to provide a spring of the character above described which will be simple in construction and efficient in operation, and which will absorb the shock of the vehicle body when moving in both upward and downward directions, thereby reducing to a minimum the discomfort of the occupants of the vehicle body due to the jolting of the same when the vehicle passes over ruts in the road.

Other objects will appear in the following description, will be pointed out in the claims and will be embodied in the accompanying drawings, in which:

Figure 1 is a side view of my invention shown interposed in operative position between a vehicle body and the axle of its running gear, parts being broken away and shown in section in order to bring out more clearly the detail of construction.

Fig. 2 is a plan view of the spring shown attached to a vehicle axle.

Referring more specifically to the detailed construction of my invention, 5 represents the axle of a vehicle and 6 represents the body of a vehicle. A plate 7 rests upon the top surface of the axle 5 and a plate 8 rests against the under surface of said axle, said plates being firmly secured to the axle 5 by means of the bolts 9. The plate 7 is provided with a plurality of upwardly extending ears 10, 11 and 12. Mounted between ears 10 and 11 is a lever 13, and mounted between ears 11 and 12 is another lever 14. The levers 13 and 14 are pivoted intermediate of their ends in crossed relation to said ears by means of a bolt 15, which passes through suitable bores therein and bores formed in said ears.

The arm 17 of lever 13 extends outwardly from the pivotal bolt 15 and is curved upwardly and is pivoted at its extreme end to a compensating shackle 18, which in turn is pivoted at 19 to the vehicle body 6. The arm 20 of lever 13 extends outwardly from pivotal bolt 15 in the opposite direction from arm 17 and is curved downwardly, its extreme end 21 being disposed below the arm 22 of lever 14 which extends in the opposite direction from arm 17 of lever 13, and is pivoted at its extreme end at 23 to the vehicle body 6. The lever 14 is provided with an arm 24, which curves downwardly, and the extreme end 25 of which is disposed directly below the arm 17 on lever 13. By this construction it will be apparent that the levers 13 and 14 are pivoted on the vehicle axle in crossed relation, and that the ends 21 and 25 of said arms are disposed below the respective arms 22 and 17 of said levers.

Interposed between the end 25 of arm 24 and the arm 17 is a compression spring 27, which surrounds a bolt 28 adapted to pass through apertures 29 and 30 formed respectively in said arms. The bolt 28 is provided with a nut 31, threaded to its lower end which rests against the lower surface of arm end 25, and interposed between the head 32 of said bolt and surrounding the same, and the upper surface of arm 17, is a compression spring 33. The arms 20 and 22 are coupled together in the same manner as arms 17 and 24 by means of the bolt 35 and the springs 36 and 37.

By the foregoing recited construction it will be obvious that the springs 27 and 37 will equally serve to absorb the shock of the downward movement of the vehicle body, and that the springs 33 and 36 will equally serve to absorb the shock of the upward rebound of the vehicle body. When the vehicle body moves downwardly the arms 17 and 24 and the arms 20 and 22 swing respectively together on the pivotal bolt 15, thereby compressing the springs 27 and 37 which cushion the vehicle body in its downward movement. When the vehicle body rebounds upwardly the arms 17 and 24 and the arms 20 and 22 swing apart respectively, thereby causing the heads of bolts 28 and 35 to compress the springs 33 and 36, which tends to absorb the shock of the upward movement of the vehicle body.

In order to prevent lateral movement of the levers 13 and 14, as well as to relieve the bending strain on pivotal bolt 15, I have provided the arms 40 and 41 which extend upwardly from plate 8 and rest against the side surfaces of said levers, the ends of said arms 40 and 41 being confined in slots 42 and 43 formed between the sides of said levers and prongs 44 and 45 extending therefrom.

What I claim is:

1. A vehicle spring, comprising a pair of levers pivoted together intermediate of their ends in crossed relation, compression springs interposed between each pair of the oppositely disposed lever ends and compression springs arranged above one end of each of said levers and coupled to opposing ends of the other lever, whereby said first mentioned springs will become compressed when the opposed ends of said levers are moved toward each other, and the second mentioned springs will become compressed when the opposed ends of said levers are moved away from each other.

2. A vehicle spring, comprising a pair of levers pivoted in crossed relation to a vehicle axle, one of the ends of each of said levers being secured to a vehicle body, a bolt secured to each of the opposite ends of said levers and passing through apertures in the first mentioned lever ends, a compression spring adapted to surround each of said bolts and interposed between said first mentioned lever ends and said opposite ends, and a compression spring adapted to surround each of said bolts and to be interposed between said bolt heads and said first mentioned lever ends.

In witness that I claim the foregoing I have hereunto subscribed my name this 21st day of June, 1920.

CHARLES A. HUNT.

Witness:
A. O. DILLON.